June 3, 1924.

C. N. BLOUGH 1,495,982

CHAIN FASTENER

Filed Jan. 23, 1923

INVENTOR,
C. N. Blough,

BY Frank Fuller
ATTORNEY.

Patented June 3, 1924.

1,495,982

UNITED STATES PATENT OFFICE.

CLARENCE N. BLOUGH, OF JOHNSTOWN, PENNSYLVANIA.

CHAIN FASTENER.

Application filed January 23, 1923. Serial No. 614,368.

*To all whom it may concern:*

Be it known that CLARENCE N. BLOUGH, a citizen of the United States, residing at Johnstown, in the county of Cambria and State of Pennsylvania, has invented certain new and useful Improvements in Chain Fasteners, of which the following is a specification.

This invention relates to a connector or fastener for chains and particularly to secure cross members to the side members of anti-skid chains for vehicle wheels.

It is aimed to provide a novel quick-detachable fastener thoroughly efficient in use adapted to fasten one or more cross chains to a plurality as distinguished from a single chain link in order to divide and proportion the strain; to provide a novel substantially spiral coil means to effect the connection between the fastener and side chains, and means to position the cross chains in non-interfering relation when a plurality are connected to the single fastener.

Various objects and advantages will be pointed out and also become apparent from a consideration of the following description taken in connection with the accompanying drawings.

In said drawings;—

Like reference characters designate like or similar parts in the different views.

Figure 1:
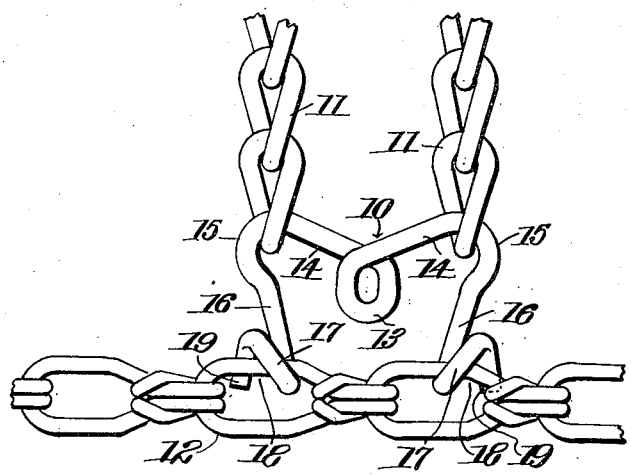
Figure 1 is a view showing the fastener in side elevation and as connecting fragments of anti-skidding chains.
Figure 2:
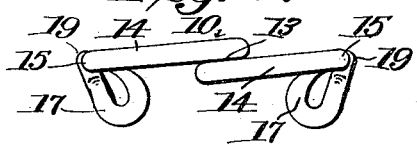
Figure 2 is a top view of the fastener alone.
Figure 3:
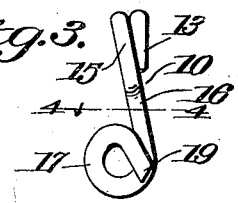
Figure 3 is an end elevation of the fastener.
Figure 4:
Figure 4 is a detail cross-sectional view on line 4—4 of Figure 3.

Referring specifically to the drawings, one form of the fastener is shown at 10 as connecting two cross-chains 11 to a side chain 12. Chains 11 and 12 are conventionally of those used in anti-skid chains for vehicle tires or wheels, but the limitation of use of the invention thereto is not to be implied, since it is capable of use in connection with chains and the like broadly. It is to be understood of course, that when used as in Figure 1, two fasteners 10 are employed, one to engage each side chain 12 and to have opposite end links of the cross chains secured thereto.

Said fastener 10 is preferably made from a single strand or relatively heavy and stiff metallic wire which is bent into shape and intermediate its ends in opposite directions to form a loop or abutment 13. From loop 13, the strand has upwardly inclined portions 14 leading to offset loops 15 from which downwardly and inwardly extending attaching arms 16 extend. Arms 16 at their free ends terminate in substantially spiral coils 17 which are spaced apart as at 18 and whose free ends or terminals 19 cease in the same plane as the inner surface of the fastener. As the coils are open the fastener may be readily passed through the end links of the chains 11 as shown and through the adjacent links of the chain 12. The terminals 19 will be located between chain 12 and the tire in practice so that in connection with the spiral coil construction, accidental detachment is precluded. The offsets 15 help to maintain the cross chains positioned in combination with portions 14 which guide the cross chains toward said offsets, and the loop 13 which prevents engagement and entangling of the cross chains.

Particular attention is called to the fact that as the coils 17 are attached to different links of chain 12, the strain is divided as distinguished from imposition on a single link.

Figure 5:
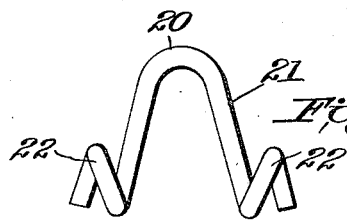
Figure 5 is a side elevation of a modified form of the fastener.

Various changes in the details may be resorted to provided they fall within the spirit and scope of the invention. For instance, as illustrated in Figure 5, the fastener has a single loop 20 to retain a single cross chain like loop 15. This form has attaching arms 21 and coils 22, respectively similar to attaching arm 16 and coils 17 in shape and function.

The fastener may be made in any suitable size or sizes and material desired.

What I claim is;—

A fastener consisting of a strand bent in opposite directions to form a loop, portions inclining away from said loop, offsets to accommodate fastening to elements and to which said portions lead, attaching arms extending from the offsets, and said arms at their free ends on the same side of the device terminating in open substantially spiral coil portions for attachment to another element.

In testimony whereof I affix my signature.

CLARENCE N. BLOUGH.